United States Patent
Persson et al.

(10) Patent No.: US 6,358,626 B1
(45) Date of Patent: Mar. 19, 2002

(54) EXTERIOR AUTOBODY PART OF REINFORCED PLASTIC, AND ARRANGEMENT AND METHOD FOR ITS FORMING

(75) Inventors: Arne Persson, Leverhultsvägen; Åke Nylinder, Norra Grinnekärrsvägen; Krister Svensson, Örlyckvägen; Axel Kaufmann, Ringvägen, all of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/508,846

(22) PCT Filed: Sep. 16, 1998

(86) PCT No.: PCT/SE98/01658

§ 371 Date: Sep. 18, 2000

§ 102(e) Date: Sep. 18, 2000

(87) PCT Pub. No.: WO99/14101

PCT Pub. Date: Mar. 25, 1999

(30) Foreign Application Priority Data

Sep. 17, 1997 (SE) ................................................ 9703342

(51) Int. Cl.7 ................................................ B21C 27/00
(52) U.S. Cl. ...................... 428/596; 428/549; 428/122; 428/172; 428/292.1; 428/293.1
(58) Field of Search ................................ 428/358, 172, 428/122, 319.7, 293.1, 292.1, 549, 599, 596

(56) References Cited

U.S. PATENT DOCUMENTS

| | | |
|---|---|---|
| 4,423,000 A | 12/1983 | Teraoka |
| 5,055,346 A | 10/1991 | Rohrbacher |
| 5,283,028 A * | 2/1994 | Breezer et al. |
| 5,456,957 A * | 10/1995 | Jackson et al. |

FOREIGN PATENT DOCUMENTS

| | | |
|---|---|---|
| EP | 0635349 | 1/1995 |
| WO | WO 94/06612 | 3/1994 |

\* cited by examiner

*Primary Examiner*—Merrick Dixon
(74) *Attorney, Agent, or Firm*—Samuels, Gauthier & Stevens, LLP

(57) ABSTRACT

An exterior autobody part of reinforced plastic intended to be mounted on a motor vehicle. The expression "exterior autobody part" refers to the autobody part being entirely or partly visible when the motor vehicle is viewed from the outside. Furthermore, the invention relates to a method and an arrangement for forming such an exterior autobody part. The exterior autobody part according to the invention comprises a number of functional layers, including load-bearing layer(s) and surface layer(s), intended to provide the properties which are required for the application, and is characterized in that load-bearing layers comprise(s) fiber-reinforced thermoplastic which forms internal cavities and/or that one or several recesses has/have been created in surface layers and load-bearing layers and that surface layers and load-bearing layers together with cavities and/or recesses thereby provide a load-bearing material structure. Examples of properties essential for the application are low weight, high stiffness, and durability, recyclability and visual properties. The invention can be applied within the field of externally visible motor vehicle parts, for example boot lids and wind deflectors.

11 Claims, 4 Drawing Sheets

EXTERIOR AUTOBODY PART OF REINFORCED PLASTIC, AND ARRANGEMENT AND METHOD FOR ITS FORMING

TECHNICAL FIELD

The present invention relates to an exterior autobody part of reinforced plastic, intended to be mounted on a motor vehicle. The expression "exterior autobody part" refers to the part being entirely or partly visible when the motor vehicle is viewed from the outside.

The invention further relates to a method and an arrangement for forming such an exterior autobody part.

The invention pertains to the fields of reinforced thermoplastic composites or laminates and vacuum forming of thermoplastic components.

The exterior autobody part according to the invention comprises a number of functional layers, intended to provide the properties which are required for the application. Examples of such properties are low weight, high stiffness and durability, recyclability and visual properties.

The invention can be applied within the field of motor vehicle components which are visible from the exterior of the vehicle, for example boot lids or wind deflectors.

BACKGROUND OF THE INVENTION

Within the field of sports equipment, a vacuum forming process is previously known for manufacturing thermoplastic articles, for example wind-surfing boards. The process utilizes two sheet-shaped material batches which are clamped in a clamping device and is therefore usually called "twin-sheet". The two braced material batches are heated and comprise thermoplastic material and, during the forming, function as elastically stretchable membranes which, by means of external vacuum and/or internal pressure acting on the membranes, are formed according to the inner contours of an enclosing, cooled forming device. By means of this previously known forming process, different hollow plastic articles which comprise thermoplastic material can be obtained.

Within the field of conventional exterior autobody parts for motor vehicles, for example boot lids, autobody parts of body panel sheets or, for example, of glass-fibre reinforced thermosetting plastic are previously known.

Conventional exterior autobody parts of sheet metal are manufactured through different metal working operations comprising rolling, pressing, bending and welding. Such sheet metal parts usually also comprise separate reinforcements in the form of stiffening profiles and similar components, which are manufactured and mounted in separate steps.

After the forming and/or mounting of a conventional exterior autobody part of sheet metal, different surface finishing and polishing steps follow in order to provide the finished autobody part with aesthetically pleasant and corrosion-protected surfaces on both the inside and the outside of the autobody part.

Where previously known exterior autobody parts of glass-fibre reinforced thermosetting plastic or other thermosetting plastic composites are concerned, such parts are manufactured in a process with several forming or laminating steps with the use of reinforcement material, for example glass-fibre mats, and thermosetting matrix material, for example vinyl ester resin. After the forming of the reinforcement material and the impregnation thereof with thermosetting matrix material, a relatively time-consuming curing follows which, for instance, may take place within a moulding or pressing tool. Thereafter, the exterior autobody part of reinforced thermosetting plastic generally has to be surface-finished and polished further in order to obtain surfaces with a surface finish of sufficient quality for the application.

The above-mentioned, previously known, exterior autobody parts can be perceived as having certain disadvantages. Where autobody parts of conventional sheet metal are concerned, it may be difficult to achieve a sufficiently low autobody part weight in order to fulfil the ever increasing demands upon low fuel consumption and low emissions to the environment which are placed upon the motor vehicles of today. Furthermore, separate surface finishing and surface polishing lines are required in order to provide material surfaces with the desired properties to the finished sheet metal parts.

Where parts of glass-fibre reinforced thermosetting plastic are concerned, the relatively time-consuming thermosetting process, and the demands for separate surface finishing and polishing steps, may be perceived as difficult. Furthermore, it is difficult to recover and recycle composite materials of thermosetting plastic.

SUMMARY OF THE INVENTION

Accordingly, the first object of the present invention is to provide an exterior autobody part of reinforced plastic, intended to be mounted on a motor vehicle, which part is recyclable in a simple way and which, without any separate reinforcements and in spite of low weight, provides sufficient stiffness and durability, and which does not require any time-consuming curing when manufactured.

This object is achieved by means of the exterior autobody part according to the invention comprising load-bearing layer(s) and surface layer(s) and that the load-bearing layer (s) comprise(s) fibre-reinforced thermoplastic which forms internal cavities and/or that one or several recesses has/have been created in the surface layers and the load-bearing layers, and that the surface layer(s) and the load-bearing layers(s) together with cavities and/or recesses provide a load-bearing material structure.

A second object of the present invention is to provide an autobody part of reinforced plastic, intended to be mounted on a motor vehicle, having a surface finish with a sufficient quality in order not to require any special surface finishing in the form of grinding or the like before painting, or which provides a surface finish of a sufficient quality in order to be left unpainted.

This object is achieved by means of the exterior autobody part according to the invention providing at least one decorative layer, between surface layer and load-bearing layer, and that the surface layer(s) and the decorative layer(s) together provide at least one external surface which provides the main portion of the visual effect and the surface properties which the exterior autobody part should exhibit when mounted on a motor vehicle, and that surface layers, decorative layers and load-bearing layers all comprise a thermoplastic and have been formed together under heating.

A third object of the present invention is to provide an arrangement for forming an exterior autobody part according to the invention.

This object is achieved by means of the arrangement according to the invention comprising a forming tool with tool halves, arranged to be opened and closed in order to create an internal form cavity, and that the arrangement comprises material holders intended for clamping at least one material batch with thermoplastic material, heating means for heating the material batch, pressurizing connection and vacuum connection intended to generate, by means of internal pressurization and external vacuum application, a forming force on the material batch functioning as a stretchable membrane after heating, and cooling means intended to cool down the heated material batch after forming inside the form cavity, and that the material batch comprises at least one load-bearing layer with reinforcement fibres.

Furthermore, a fourth object of the present invention is to provide a simple and effective method for forming an exterior autobody part according to the invention.

This object is achieved by means of the method according to the invention comprising the use of a forming tool with first and second tool halves arranged to be opened and closed in order to create an internal form cavity, and that thereby at least one material batch with thermoplastic material is clamped between the tool halves in an open position by means of material holders, after which the material batch by means of heating means is heated to or above the softening temperature of the thermoplastic material, that the tool halves are thereafter closed around the material batch while a vacuum is applied between the material batch and the first tool half, wherein the material batch functions as a stretchable membrane and is formed according to the internal surface of the first tool half, after which cooling means in the tool halves gradually cools down the material batch to a temperature below the softening temperature, that the tool halves are brought into an opened position and that thereafter a blank is removed from the forming tool in order to provide, after trimming and making of holes, an exterior body part of reinforced plastic with a load-bearing structure.

BRIEF DESCRIPTION OF THE DRAWINGS

In the following, the invention will be described with reference to the attached drawings, in which.

DETAILED DESCRIPTION OF PREFERRED EMBODIMENTS

Figure 1:
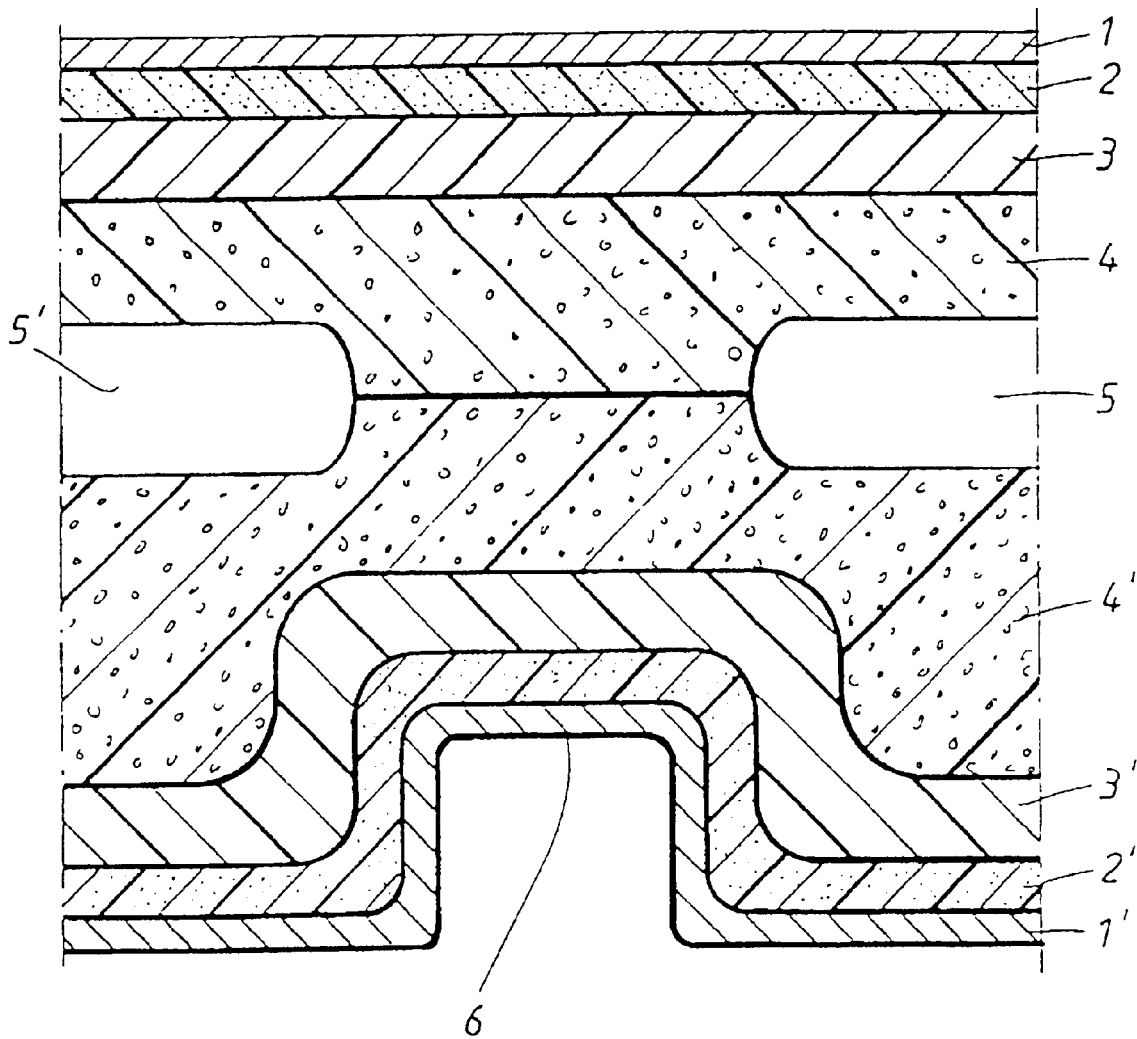
FIG. 1 shows a schematic cross-section of a portion of an exterior autobody part according to the invention.

In the attached FIG. 1, a schematic cross-section of an exterior autobody part of reinforced plastic, according to a first preferred embodiment of the invention, is shown. The shown cross-section is a portion of a boot lid for a motor vehicle, wherein the upward surface in the drawing corresponds to the outside of the boot lid when this is mounted on a motor vehicle, whereas the downward surface in the drawing corresponds to the inside of the boot lid.

Thus the exterior body part shown in FIG. 1 from the outside inwards, i.e. from top to bottom in FIG. 1, comprises a first surface layer 1, a first decorative layer 2, a first structural layer 3 and a first load-bearing layer 4. Thereafter one or several cavities 5, 5' follow, which have been created during the forming in suitable positions inside the structure of the exterior autobody part according to the invention.

Thereafter, counted from top to bottom in FIG. 1, i.e. inwards on the vehicle, there follows a second load-bearing layer 4', a second structural layer 3', a second decorative layer 2' and finally, i.e. facing towards the inside of the boot lid, a second surface layer 1'.

In a portion of the exterior body part according to the invention shown in FIG. 1, a recess 6 or groove has been impressed, using a forming tool.

When comparing an exterior autobody part according to the invention with a conventional exterior autobody part of painted sheet metal, the load-bearing layers 4, 4' and the cavities 5, 5' according to the invention together can be said to correspond to the structure which is formed by the sheet metal of a conventional autobody part. The structural layers 3, 3' can be said to correspond to a layer of the sheet metal with layers of primer/rust finish, the decorative layers 2, 2' can be said to correspond to the surface paint, whereas the surface layers 1, 1' of the exterior autobody part according to the invention can be said to correspond to external clear varnish of the conventional body part.

The recess 6 contributes to high stiffness of the exterior autobody part according to the invention and therefore can be said to correspond to a stiffening profile or beam in a conventional sheet metal part.

Because of the structure which is created by the two load-bearing layers 4, 4 with cavities 5, 5' enclosed therebetween, the exterior body part according to the invention provides a so-called sandwich structure with low weight but still with a sufficiently high stiffness and load-bearing ability for the application. Further more, the recess 6 created in the forming contributes to the stiffness of the sandwich structure. Accordingly, the exterior autobody part according to the invention requires no additional reinforcements in the form of attached profiles or beam structures.

Furthermore, the structural layers 3, 3', the decorative layers 2, 2' and the surface layers 1, 1' together provide external surfaces to the exterior autobody part according to the invention with the surface properties required for the application. Amongst such surface properties, visual decorative effect (e.g. colour and gloss), impact and scratch resistance, and also dirt and water repellent properties can be mentioned. Accordingly, the exterior autobody part according to the invention requires no special surface finishing in the form of grinding or the like before possible painting or varnishing or can preferably be left unpainted.

In the following, with reference to the attached FIG. 2, preferred embodiments of a method and an arrangement according to the invention will be described.

The method according to the described embodiment utilizes two sheet-shaped material batches 10, 11 which can be said to constitute part of an arrangement according to the invention. A first, essential task of the material batches is of course to provide raw material for the forming of an exterior autobody part according to the invention, wherein the two sheet-shaped material batches together comprise the different functional layers which have been described above.

In the described embodiment, the two material batches 10, 11 are intended to be clamped mirror-inversely against each other between the tool halves 12, 13 of a forming tool, so that the layers which are intended to constitute the above-mentioned load-bearing layers are facing each other.

In the described embodiment, the two material batches 10, 11 consist of a multilayered material which has been manufactured by means of extrusion in a so-called multi-layer extruder. In principle, a multi-layer extruder consists of several individual extruders, the nozzles of which are arranged to be able to, preferably simultaneously, extrude several different melted thermoplastic layers on top of each other in order to obtain a multilayered material with different material composition in different layers.

In the first embodiment, the multilayered material which is used for the two material batches comprises a 0.2 mm thick extruded first polymetachrylate layer (PMMA). After the forming, this layer is intended to constitute one of the above-mentioned surface layers of the exterior autobody part according to the invention.

Inside the first PMMA-layer, a second 0.2 mm thick extruded PMMA-layer with an addition of colouring pigment follows. The colouring has been achieved by means of using PMMA-granules with an pigment addition when extruding this layer. After forming, this layer in intended to constitute one of the above-mentioned decorative layers of the exterior autobody part according to the described first embodiment of the invention.

Inside the two PMMA-layers there follows an extruded layer of acrylo-butadiene styrene plastic (ABS) with 1.6 mm thickness. In the described embodiment, also the ABS-layer contains an addition of colouring pigment. After forming, this layer is intended to constitute one of the above-mentioned structural layers of the exterior autobody part according to the invention.

Finally, the multilayered material outside the ABS-layer comprises a layer of extruded, glass fibre-reinforced ABS-plastic with 3.0 mm thickness. After forming, this layer is intended to constitute one of the above-mentioned load-bearing layers of the exterior autobody part according to the invention.

Figure 2A:
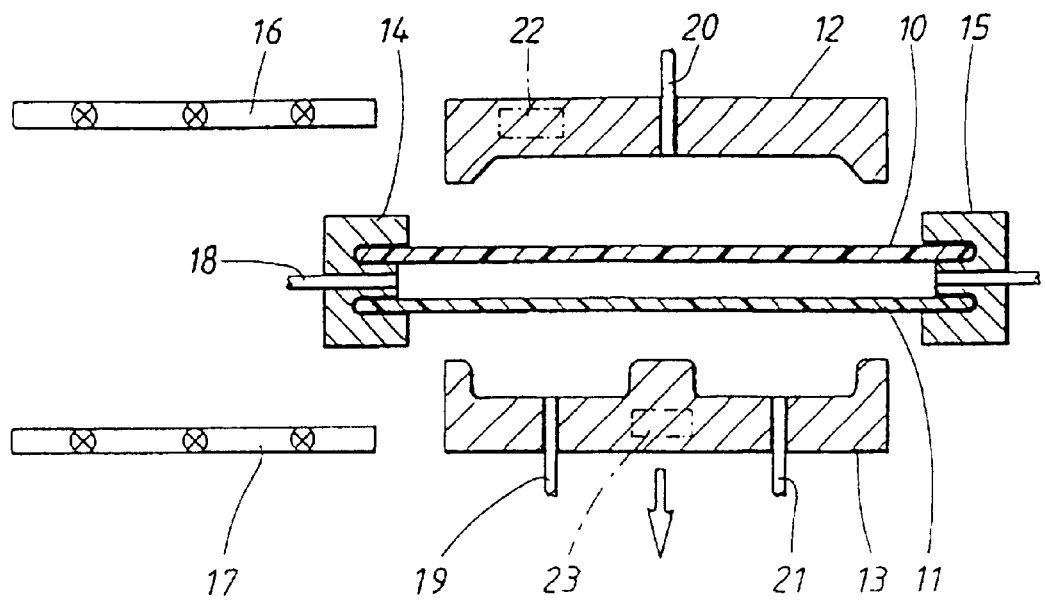
FIG. 2 illustrates schematically in the sub-FIGS. 2A to 2D a method according to the invention practised by means of an arrangement according to the invention.

When manufacturing an exterior autobody part according to the described embodiment, as shown in FIG. 2A, two material batches 10, 11 of the above-described type are clamped in parallel to each other by means of the material holders 14, 15 of a forming tool with its tool halves 12, 13 in an opened position. Thereby, the forming tool is of a type which is previously known for forming in accordance with the above-mentioned twin-sheet process.

In the described embodiment, in connection with the forming tool, heating means in the form of two sets of IR-lamps or IR-ramps 16, 17 in pairs are provided, which are intended for heating of the above-mentioned material sets 10, 11.

Figure 2B:
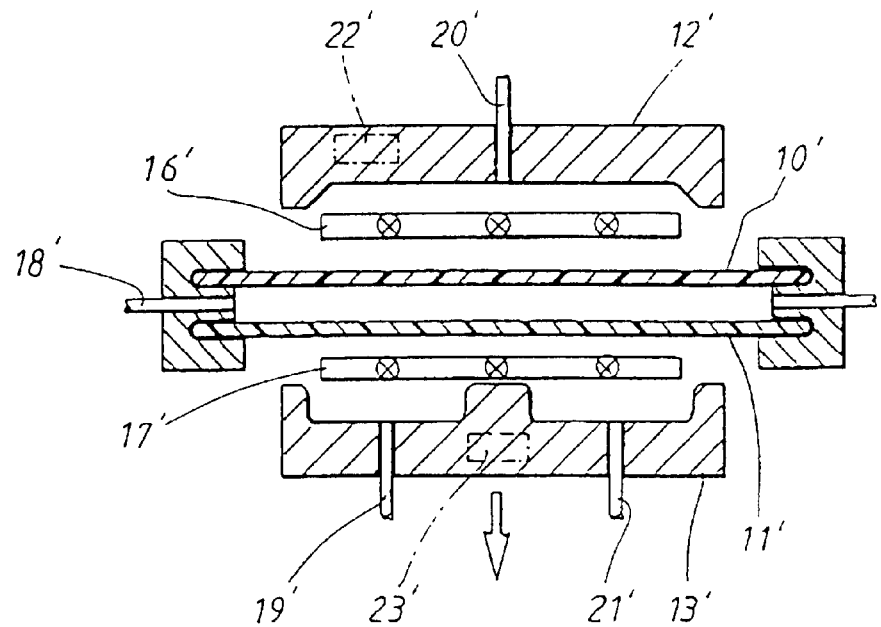

By means of a therefore intended actuating means (not shown), the two IR-ramps 16', 17' are displaced into the open forming tool so that they arrive at a position between each material batch 10', 11' and each tool half 12', 13'. This situation is shown in FIG. 2B.

Thereafter, in a heating stage, the two material batches 10', 11' are heated to approximately 250° C. by means of activating the IR-lamps of the IR-ramps 16', 17'.

In the described embodiment, the forming tool is arranged in such a way that it is possible to apply an over-pressure between the material batches 10, 11, as well as between the lower tool half 13 and the lower material batch 11. Such a pressurization is attained by means of first pressurizing connection 18, arranged so that it exits between the two material batches 10, 11, and by means of second pressurizing connection 19, which exits between the lower material batch 11 and the second tool half 13.

Furthermore, by means of the first 20 and second 21 vacuum connections, vacuum can be applied between the upper tool half 12 and the upper material batch 10, and between the lower tool half 13 and the lower material batch 11.

In the described embodiment, pressurization via the pressurizing connections 18', 19' takes place in connection with the heating phase, shown in FIG. 2B, with the purpose of avoiding deflection caused by the elongation which arises in the material batches 10', 11' when they are approaching the softening temperatures of the constituent thermoplastics.

When the material batches 10', 11' have been heated to approximately 250° C., the two IR-ramps 16", 17" are withdrawn from the forming tool, after which the tool halves 12", 13" are closed around the therein enclosed, heated material batches 10", 11". Such a situation is shown in FIG. 2C.

Thereafter, vacuum is applied between the upper tool half 12" and the upper material batch 10" via the first vacuum connection 20", and between the lower material batch 11" and the lower tool half 13" via the second vacuum connection 21". Simultaneously with the vacuum application, the space between the two material batches 10", 11" is pressurized via the pressurizing connection 18".

Figure 2C:
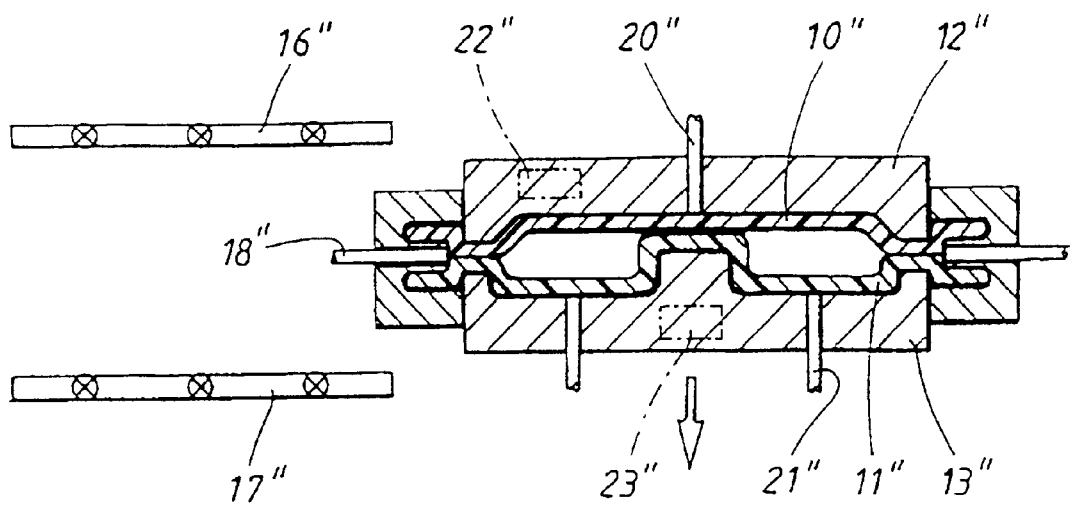
Figure 2D:
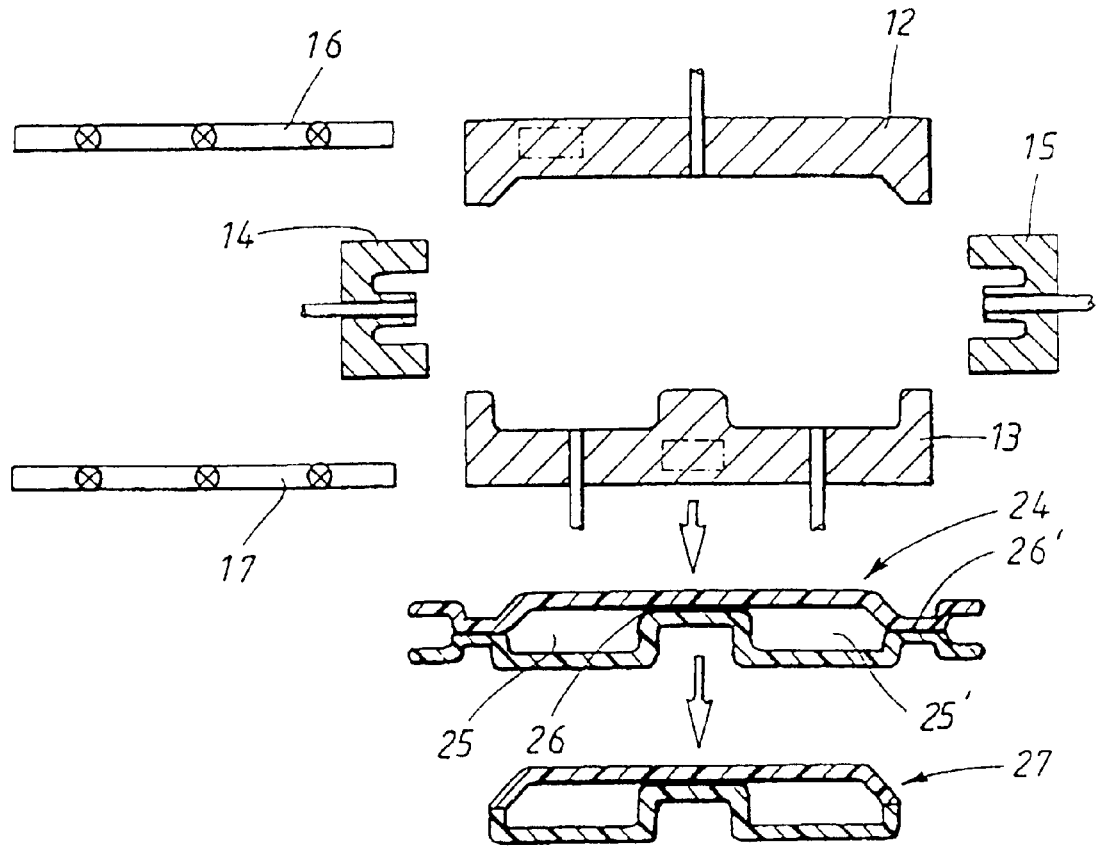

The simultaneous internal pressurization and external vacuum application result in the heated material batches 10", 11", inside the closed forming tool shown in FIG. 2C, being formed according to the form cavity created by the closed tool halves 10", 11'.

In the two tool halves 12", 13", cooling means 22" and 23" are arranged, which in the described embodiment comprise cold water coils.

When the forming of the heated material batches shown in FIG. 2C has taken place, the formed material batches will gradually be cooled down by means of the cooling means 22", 23". This implies that the thermoplastic material included in the material batches gradually solidifies when the temperature falls below the softening temperature.

When the material batches 10", 11" have been cooled down sufficiently, the tool halves are opened and a blank 24 for an exterior autobody part according to the invention is removed from the forming tool. The two material batches have now been consolidated and have adopted a shape, the outer dimensions of which essentially correspond to the dimensions of the form cavity which is created inside the forming tool when the two tool halves are in a closed position. Because of the pressurization and vacuum application, cavities 25, 25', and portions 26 in which the two material batches are attached to each other by thermal bonds, have been created.

During the forming process, as a rule, the thickness of the layers included in the two material batches is reduced by approximately half of the original thickness.

After necessary after-treatment, such as for example trimming and making of holes for attachments and the like, an exterior autobody part 27 according the invention, intended to be mounted on a motor vehicle, is obtained.

In the described embodiment, the exterior autobody part according to the invention is intended to be used for a boot lid of a motor vehicle and is ready for mounting directly after the manufacture.

However, even if such embodiments are less advantageous, it is also conceivable with embodiments in which the exterior autobody part according to the invention is painted or varnished in a separate stage.

In preferred embodiments of the invention, no separate painting is needed, something which provides environmental advantages.

Furthermore, the exterior autobody part according to the invention is based on thermoplastic, which offers great possibilities for material recovery, since thermoplastic can be melted and reused when extruding new plastic components.

In particularly preferred embodiments of the invention, the constituent thermoplastics are blendable with each other, for example in extrusion, something which further facilitates material recovery.

In principle, an imaginary recycling of an exterior autobody part according to the invention, for example a boot lid for a motor vehicle, could be achieved in the following steps:

1) coarse shredding of the part together with metal components such as locks and the like,
2) metal separation,
3) fine milling,
4) preparation of granules of recycled thermoplastic, and
5) admixing a certain proportion of the granules when extruding a new multilayered material for use in material batches when manufacturing new exterior autobody parts.

A recycling process as described above can, with great advantage, be used for the recovery of waste which is generated in the forming process, but could also be used for recovering exterior autobody parts according to the invention from scrapped motor vehicles.

The present invention is in no way limited to what has been disclosed in connection with the preferred embodiments or to what is shown in the attached drawings, but the scope of the invention is defined by the attached claims.

Accordingly, it is also conceivable with less preferred embodiments of the invention in which a single material batch is utilized and that the material batch by means of vacuum application and/or pressurization thereby acts like a stretchable membrane which is formed against an internal surface of a forming tool. In such a case, the exterior autobody part according to the invention obtains no internal cavity and therefore has to be provided with through profiles, folds or edges during the forming, in order to be able to provide sufficient stiffness and load-bearing ability.

The composition of the layers which are included in the exterior autobody part according to the invention can be varied to a high degree. Thereby, a large number of thermoplastics are conceivable as long as the thermoplastic material is able to provide the properties required for the application, for instance, when heat resistance, impact resistance, surface hardness, stiffness etc. are concerned. In addition to the above-mentioned ABS- and PMMA- thermoplastics, polypropylene (PP) can be mentioned.

When the reinforcement material included in the load-bearing layers is concerned, this can comprise both cut and continuous fibres, which can be provided, for example, in the form of individual fibres, in the form of a nonwoven material with individual fibres, or in the form of a woven, knitted or braided textile fabric. In connection with the extrusion, however, the reinforcement material must be possible to integrate into the multilayered material which is to be used for the material batches used in the forming process. Suitable reinforcement fibres are advantageously selected amongst fibres with high stiffness and tenacity, such as glass fibres, carbon fibres, kevlar fibres, nomex fibres, polyester fibres or aramide fibres.

There is also a large number of different additives which might be conceivable as admixtures when manufacturing raw material for exterior autobody parts according to the invention. Examples of such additives are colouring pigments, uv-stabilizers and flame-proofing agents.

Furthermore, it should be noted that the temperature, pressure and vacuum levels, which are used for pressurization and vacuum application in connection with the forming, have to be set separately for each individual case, depending on raw material, layer thicknesses etc. Such as adaptation, however, can comparatively easily be performed by a skilled person within the field.

In the foregoing, it has been mentioned that the exterior autobody part according to the invention can be designed e.g. as a boot lid for a motor vehicle. However, the exterior autobody part according to the invention can be utilized in a number of other positions in the body panelling of a motor vehicle, such as a passenger car or a truck.

Figure 3:
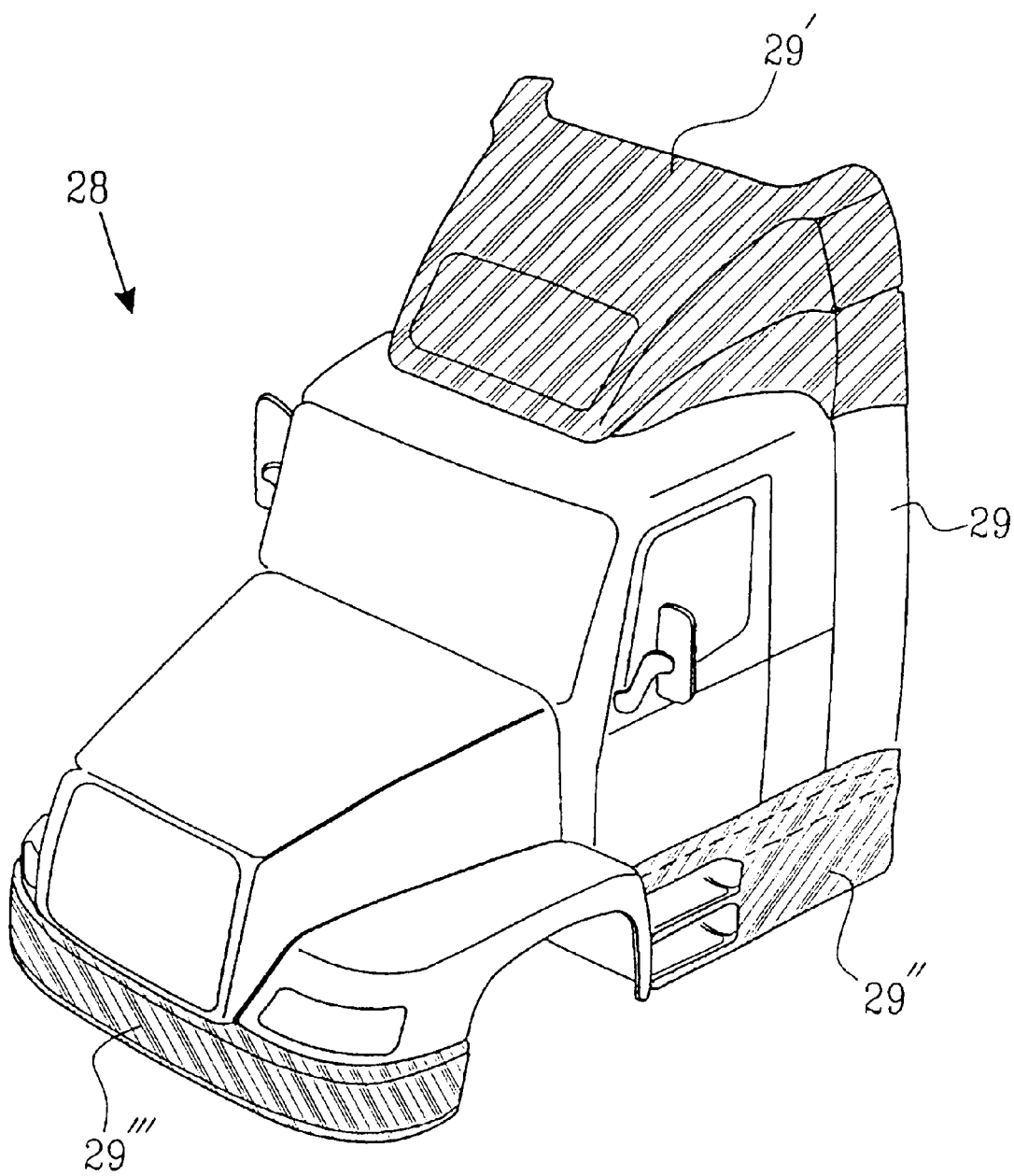
FIG. 3 shows an external perspective view of the driver's cab of a truck, wherein one of the body panels visible in the drawing is constituted of an exterior autobody part according to the invention.

Accordingly, FIG. 3 shows an external perspective view of the driver's cab 28 of a truck, wherein one of the body panels 29 which are visible in FIG. 3 is constituted of an exterior autobody part according to the invention, designed as a so-called wind deflector 29. Even if invisible in FIG. 3, a corresponding wind deflector is present on the opposite side of the shown driver's cab. In FIG. 3, three other conceivable, advantageous positions 29', 29", 29''' for exterior autobody parts according to the invention are also indicated.

What is claimed is:

1. A material batch for vacuum forming an exterior autobody part of reinforced plastic, intended to be mounted on a motor vehicle, said material batch comprising load-bearing layers and surface layers, wherein said load-bearing layers comprise fiber-reinforced thermoplastic which creates internal cavities in the exterior autobody part after the vacuum forming, and/or that said surface layers and said load-bearing layers comprising fiber-reinforced thermoplastic provide one or several recesses in the exterior autobody part after the vacuum forming, so that said surface layers and load-bearing layers together with said cavities and/or recesses provide a load-bearing material structure of the vacuum-formed exterior autobody part after the vacuum forming.

2. A material batch according to claim 1, wherein said material batch provides at least one decorative layer between said surface layers and load-bearing layers, and that said surface layers and said decorative layers after vacuum forming together provide at least one outer surface which provides the main portion of the visual effect and the surface properties which the exterior autobody part should exhibit when mounted onto a motor vehicle, and that said surface layers, decorative layers and load-bearing layers all comprise a thermoplastic and are intended to be formed together under heating in order to provide said exterior autobody part.

3. A material batch according to claim 1, wherein a structural layer comprising thermoplastic material is provided between said decorative layer and load-bearing layer.

4. A material batch according to claim 1, wherein said material batches, counted from a first external surface to a second, opposite external surface of the exterior autobody part, comprises a surface layer, a decorative layer, a structural layer, a load-bearing layer, a structural layer, a decorative layer and a surface layer.

5. A material batch according to claim 1, wherein the decorative layer and/or the structural layers comprise a dye or a pigment.

6. A material batch according to claim 1, wherein said load-bearing layers comprise reinforcement fibers selected from the group consisting of glass-fibers, carbon fibers, kevlar fibers, nomex fibers, polyester fibers and aramide fibers.

7. A material batch according to claim 1, wherein said material batches include at least one thermoplastic selected from the group consisting of ABS, PMMA and PP.

8. An exterior autobody part of reinforced plastic according to claim 1, which is intended to be mounted on a motor vehicle, wherein said exterior autobody part has been vacuum-formed from one or several material batches.

9. An exterior autobody part of reinforced plastic according to claim 8, wherein said exterior autobody part comprises recycled material originating from other exterior autobody parts.

10. An exterior autobody part of reinforced plastic according to claim 8, wherein said exterior autobody part is designed as a boot lid for a motor vehicle.

11. An exterior autobody part of reinforced plastic according to claim 8, wherein said exterior autobody part is designed as a wind deflector for a motor vehicle.

* * * * *